INFORMATION PULSE TRANSMISSION SYSTEM
Filed May 12, 1964 4 Sheets-Sheet 1
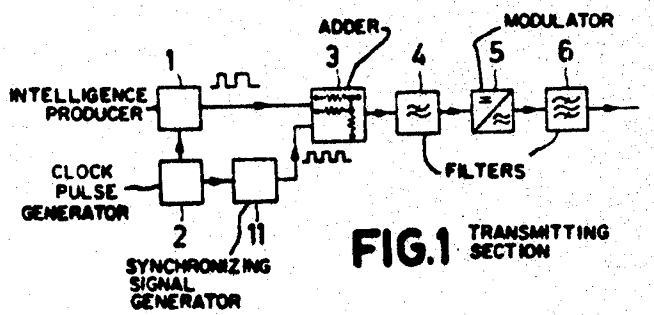
FIG.1
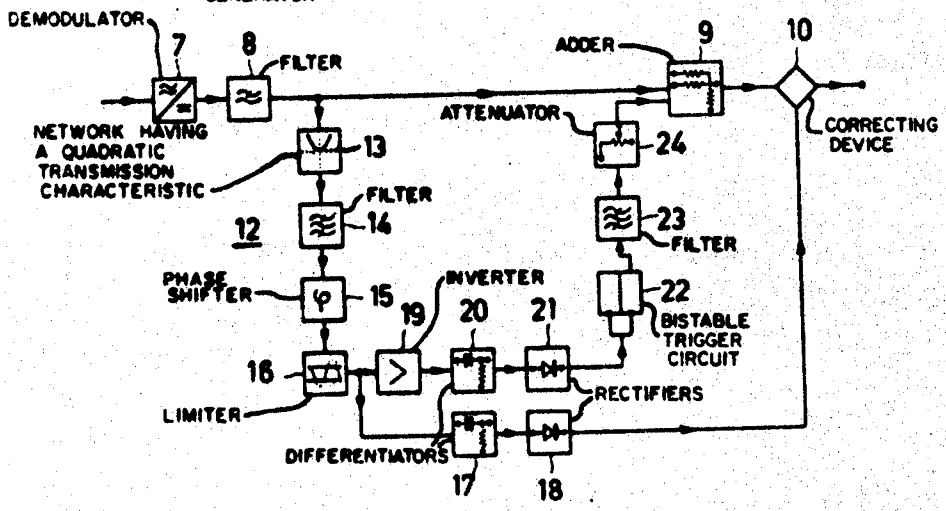
FIG.2 RECEIVING SECTION
INVENTORS
FRANK DE JAGER
LEO E. ZEGERS
BY
Frank R. Jufani
AGENT INVENTORS
FRANK DE JAGER
LEO E. ZEGERS
BY
Frank R. Jifari
AGENT INVENTORS
FRANK DE JAGER
LEO E. ZEGERS
BY
Frank R. Jifai
AGENT June 25, 1968 F. DE JAGER ET AL 3,390,232

INFORMATION PULSE TRANSMISSION SYSTEM

Filed May 12, 1964 4 Sheets-Sheet 4

INVENTORS
FRANK DE JAGER
LEO E. ZEGERS
BY
Frank R. Trifari
AGENT

United States Patent Office 3,390,232

Patented June 25, 1968

3,390,232

INFORMATION PULSE TRANSMISSION SYSTEM

Frank de Jager and Leo Eduard Zegers, Emmasingel, Eindhoven, Netherlands, assignors to North American Philips Company, Inc., New York, N.Y., a corporation of Delaware

Filed May 12, 1964, Ser. No. 366,728
Claims priority, application Netherlands, May 15, 1963, 292,831
10 Claims. (Cl. 178—69.5)

ABSTRACT OF THE DISCLOSURE

A pulse transmission in which the transmitter adds synchronizing pulses to the output signal. The synchronizing pulses have successive zero passages that coincide with the zero passages of the fundamental frequency of the information pulses, and the repetition rate of the synchronizing pulses is half the repetition rate of the clock pulses. The receiver applies the sum signal input to a network having a quadratic transmission characteristic for deriving synchronized clock pulses.

This invention relates to an information pulse transmission system comprising a transmitting device and a receiving device. The transmitter is adapted to emit information pulses which coincide with a sequence of equidistant clock pulses. The receiver is adapted to correct the time shifts occurring along the transmission path in the instants of occurrence of the information pulses with the aid of a clock signal synchronized with the clock pulses.

Such systems are employed for the transmission of intelligence.

These systems involve the problem of producing, at the receiver end, a clock signal which indicates the instants of occurrence of the information pulses with the correct phase. It has been proposed to derive a control-signal from the zero passages of the information signal formed by the information pulses, said control-signal controlling, subsequent to smoothing, the phase of a clock signal generator. In practice it often occurs that for a long time there are no zero passages in the information signal as well as in the intervals between intelligence transmissions, so that the phase of the clock signal generator is likely to shift.

The use of a pilot signal involves, in practice, the disadvantage that it requires additional bandwidth so that the bandwidth available for the information transmission is reduced, while in the case of a pilot signal lying beyond the transmission band proper the phase of the pilot signal must be equalised separately.

The invention has for its object to provide a phase-correct clock signal transmission in a system of the kind set forth with optimum utilisation of the available transmission band for the transmission of the information signal.

The system according to the invention is characterized in that the transmitting device comprises an adding circuit to which the information pulses are applied and which adds a synchronising signal to the information signal formed by the information pulses. The synchronizing signal has a smaller amplitude than the information signal and contains a frequency component, the successive zero passages of which coincide with the sucessive zero passages of the fundamental oscillation of a periodical information signal occurring at the place of the adding circuit. The pulse repetition frequency of said information signal is equal to half the pulse repetition frequency of the sequence of equidistant clock pulses, and the sum signal thus formed is transmitted to the receiving device. In the receiving device the sum signal is applied, for producing a clock signal synchronous with the clock pulses, to a network having a quadratic transmission characteristic curve. The output of this network is connected to a filter tuned to the pulse repetition frequency of the clock pulses, and the clock signal is from this filter.

The invention will now be described more fully with reference to the drawing.

FIG. 1 shows in a block diagram an embodiment of a transmitting device suitable for use in a system according to the invention.

FIG. 2 shows in a block diagram an embodiment of a receiving device suitable for use in a system according to the invention.

Figure 5:
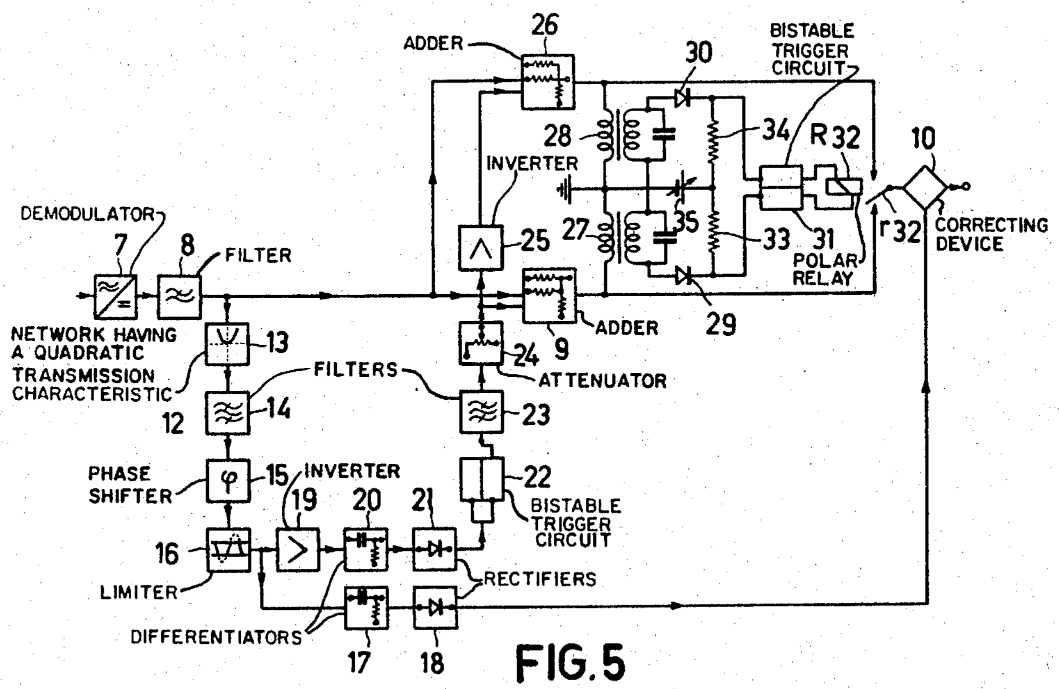
FIG. 5 shows in a block diagram a preferred embodiment of a receiving device according to the invention and FIG. 6 shows an alternative to the receiving device shown in FIG. 5.
Figure 6:
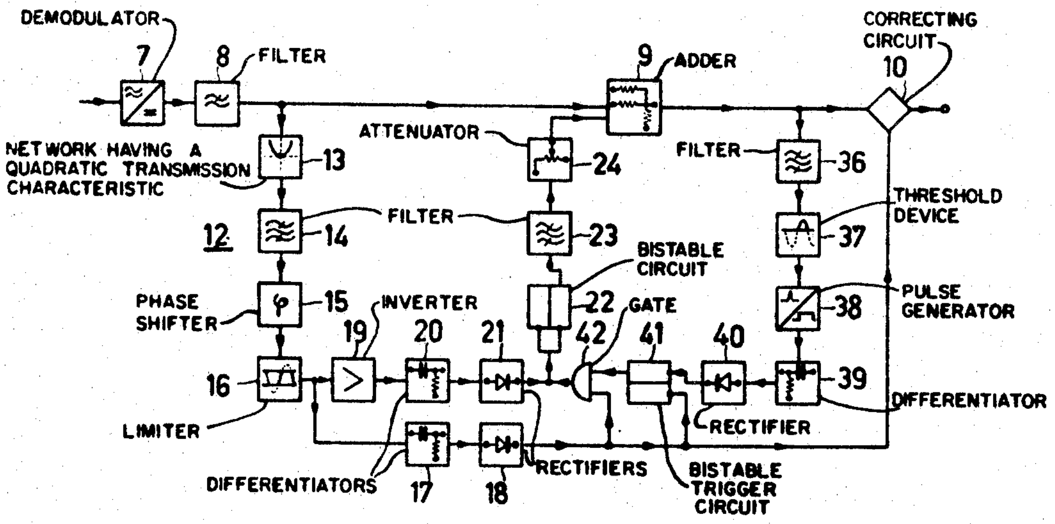

In FIGS. 2, 5 and 6 corresponding circuit elements are designated by the same reference numerals.

The transmitting device shown in FIG. 1 forms part of a transmitting station of a system for the transmission of intelligence and the receiving device shown in FIG. 2 forms part of a receiving station of said transmission system.

Figure 3:
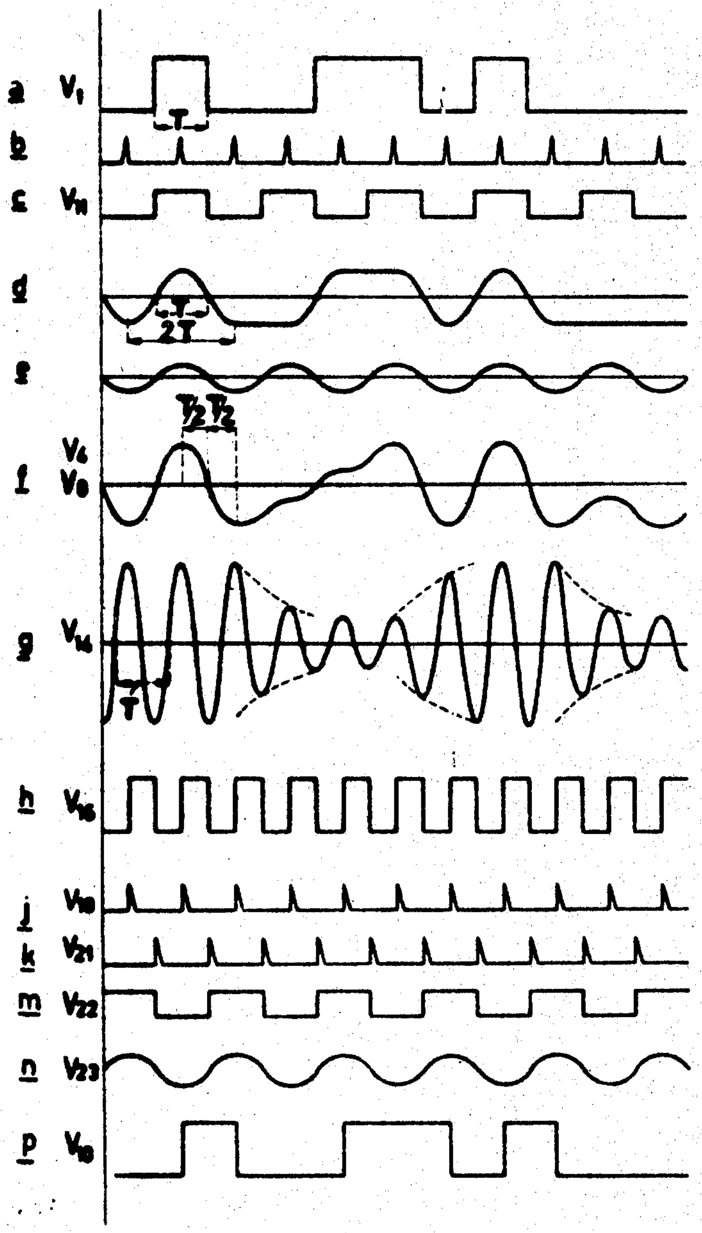
FIGS. 3 and 4 show a few waveforms occurring in the transmitting and receiving devices.

The transmitting device comprises an intelligence producer 1 and a clock pulse generator 2. Under the control of the clock pulse generator 2 the intelligence producer 1 provides information pulses, the instants of occurrence of which coincide with a sequence of equidistant clock pulses. The presence or the absence of an information pulse at a clock instant determined by a clock pulse depends upon the structure of the intelligence. The instant of occurrence of a pulse is to be understood to mean herein, as usual, the instant when the pulse attains the maximum value and in the case of square-wave pulses the instant which coincides with the centre of the pulse. In FIG. 3*a* part of the transmitted sequence of information pulses is illustrated, the instants of occurrence of which coincide with the sequence of equidistant clock pulses illustrated in FIG. 3*b*. The sequence of information pulses may be designated by MSSMMSM . . . , wherein M denotes the presence and S the absence of an information pulse at a clock instant determined by a clock pulse. The information pulses at the output of the intelligence producer 1 are applied through an adding circuit 3 and a low bandpass filter 4 to a modulator 5, which modulates the information signal of the output of the filter 4 on a carrier oscillation. The waveform of the information signal at the output of the filter 4 is illustrated in FIG. 3*d*. With a corrected transit time distortion and a limit frequency slightly exceeding the frequency $f_1 = \frac{1}{2}T$, wherein T indicates the pulse duration, each pulse has approximately the form of a lifted cosine, the width at the foot of which is 2T and at half the pulse height T.

When at two consecutive clock instants there is an information pulse present, the output voltage of the filter 4 between the pulses remains substantially constant.

The modulated carrier oscillation is finally emitted through a band filter 6 towards the receiving device shown in FIG. 2. The modulated carrier oscillation is demodulated in the receiving device by the demodulator 7 and through a low bandpass filter 8 and an adding circuit 9 it is applied to the input of a correcting device 10 for correcting the instants of occurrence of the information pulses and for recovering the waveform of the information pulses. The demodulated information signal at the output of the low bandpass filter 8 has the same waveform as the information signal of FIG. 3*b* at the transmitter end, when noise and interference signals are absent.

Due to noise and interference signals shifts occur along the transmission path in the instants of occurrence of the information pulses; this is termed "jitter." The correcting device 10 takes a sample of the incoming demodulated information signal at periodically recurring sampling instants, which coincides nominally with the instants of occurrence of the information pulses and it determines from the sample whether there is an information pulse present and it delivers at the output a direct voltage signal, the level of which depends upon the presence or the absence of the information pulse. At the output of the correcting device 10 there is thus formed a sequence of information pulses of the same waveform as is shown in FIG. 2*a*. This pulse sequence is delayed for half the pulse duration with respect to the demodulated information signal. The sampling instants are determined by a sequence of equidistant clock pulses, which are derived from a clock signal at the receiver end. In operation the time differences between the sampling instants and the corresponding instants of virtual occurrence of the information pulses must at an average be at a minimum and at an average there should be no time shifts in one direction or in the other. Therefore the clock signal must have a fixed phase relationship with the demodulated information signal or in other words the clock signal must be a phase-correct clock signal.

In the present transmission system a synchronising signal is transmitted, in addition, in the same frequency band in which the information signal is transmitted. In the transmitter shown by way of example the synchronising signal has the waveform shown in FIG. 3*c*. The synchronising signal is supplied by a signal generator 11 under the control of the clock pulse generator 2. The synchronising signal at the output of the signal generator 11 is applied to a second input of the adding circuit 3, where it is added to the information signal formed by the information pulses in the amplitude ratio of 1:2. At the output of the low bandpass filter 4 the synchronising signal has the sine waveform shown in FIG. 3*e*, which form represents the fundamental oscillation of the squarewave synchronising signal shown in FIG. 3*c*. It is therefore also possible to add a sinusoidal synchronising signal at the output of the filter 4 to the information signal. The synchronising signal has a given phase position relative to the information signal. FIGS. 3*a* and 3*c* have the same time scale and the synchronising signal is illustrated in the desired phase position relative to the information signal. The synchronising signal therefore has the same waveform as a periodic information signal. Having a pulse repetition frequency $f_1=1/(2T)$ equal to half the pulse repetition frequency of the clock pulses. This information signal may be indicated by MSMS. . . . Such a sequence of information pulses which are present and absent alternately at consecutive clock instants, is termed hereinafter the information signal with maximum pulse alternating frequency. At the output of the filter 4 approximately only the fundamental oscillation is left of the squarewave synchronising signal. It is sufficient for the synchronising signal to include said fundamental oscillation or an oscillation having a phase shift of 180° relative thereto. In the claims accompanying the present application the synchronising signal is defined as a signal including a frequency component (FIG. 3*e*) having successive zero passages which coinicde with the successive zero passages of the fundamental oscillation of a periodic information signal occurring at the area of the adding device (FIG. 3*c*), the pulse repetition frequency of which is equal to half the pulse repetition frequency of the sequence of equidistant clock pulses (FIG. 3*b*).

The amplitude of the synchronising signal is at any rate chosen so as to be smaller than the amplitude of the information signal and preferably the amplitude ratio is 1:2. The sum signal occurring at the output of the low bandpass filter 4 is shown partly in FIG. 3*f*.

The sum signal is modulated by the modulator 5 on a carrier oscillation and emitted through the bandfilter 6 to the receiving device shown in FIG. 2. At the receiver end the sum signal is demodulated by a demodulator 7 and through the low bandpass filter 8 it is applied to an input of an adding device 9 and to the input of a circuit 12. The demodulated sum signal at the output of the low bandpass filter 8 has, in the absence of noise and interference signal, the same waveform as is illustrated in FIG. 3*f* for the sum signal at the transmitter end.

It will now be described how a phase-correct clock signal is derived from the demodulated sum signal. The demodulated sum signal is applied to the input of a circuit 12, which includes in order of succession a network 13 having a quadratic transmission characteristic curve, a filter 14, tuned to the frequecny $f_2=1/T$, a 90° phase-shifting network 15 and a limiter 16. The transmission characteristic curve of the network 13, which respresents the relationship between the output voltage $E_o$ and the input voltage $E_i$, has a quadratic component so that in the formula indicating the relation between $E_o$ and $E_i$ there is a term which is proportional to $E_i^2$. The network 13 may be constructed for example as a fullwave rectifying circuit of known type, having two diodes and a transformer with a centrally tapped secondary winding. At the output of the filter 14 there appears an oscillation having equidistant zero passages, the distance between which is equal to $T/2$, corresponding to the frequency $f_2=1/T$, the amplitude of which varies between a given minimum and a given maximum value, the instants of occurence of the zero passages having, however, an invariable time position relative to the zero passages of the synchronising signal. The amplitude of the output oscillation of the filter 14 is at a maximum when the information signal has the maximum pulse alternating frequency and the same phase as the synchronising signal. This maximum value is proportional to $(a+1)^2$, wherein $a$ indicates the relation between the amplitude of the information signal and the amplitude of the synchronising signal. When the information signal has the maximum pulse alternating frequency and is shifted in phase through 180° relative to the synchronising signal, the amplitude of the output oscillation of the filter 14 is proportional to $(a-1)^2$. In the absence of an information signal or if the information signal only consists of a direct-current component, the amplitude of the output oscillation is proportional to $(1)^2$, since $a$ can be supposed to be zero. In practice the amplitude of the output oscillation must always exceed a given minimum value. The minimum value of the amplitude is equal to the lower one of the values $(a-1)^2$ and $(1)^2$, so that an optimum must be attained when $a$ is chosen so that these values become equal, which is the case when $a$ is chosen to be equal to 2. The sum signal, the waveform of which is shown in FIG. 3*f*, may be considered to be built up approximately in the close proximity of each zero passage of the synchronising signal, from a direct-current term, which may be positive, negative or zero, and from a sinusoidal term, which can be indicated by $\sin(\pi x/T)$, wherein $x$ represents a time variable, the zero point of which coincides with the zero passage of the synchronising signal and wherein $x$ extends from $-T/2$ to $+T/2$ on either side of a zero passage. When the amplitude of a sinusoidal term of the synchronising signal only is assumed to be 1, the amplitude factor of the sinosoidal term of the sum signal is $+1$ or $-1$, when the edges of the synchronising signal and the edges of the information signal have opposite directions and $+3$ or $-3$, when the edges have the same directions. The zero passages of the synchronising signal have a distance from each other of T, so that the zero passages of the sinusoidal terms are shifted relatively to each other by a whole number of periods. The output voltage E$o$ of the network 13 includes a term E$i^2$, so that in the expression for the output voltage the square of the sinusoidal term is found. This term is represented by $(\sin(\pi x/T))^2$; this leads to a term $\cos(2\pi x/T)$ with the frequency $f_2=1/T$. The term $\cos(2\pi x/T)$ have an amplitude factor varying with time but always having the same polarity. These partial oscillations are shifted relatively to each other by a whole number of complete periods, so that all of them are in co-phase. The input of the filter 14 is therefore excited by parts of an oscillation having the frequency $f_2=1/T$; said partial oscillations are all in co-phase and only the amplitude factor of the partial oscillation is variable. At the output of the filter 14 there appears a continuous oscillation, the zero passages of which have the same position as the zero passages of the partial oscillation so that the zero passages are equally spaced apart from each other and occupy a fixed time position relative to the zero passages of the synchronising signal, and only the amplitude of the output oscillation is variable. The output oscillation of the filter 14 is shown diagrammatically in FIG. 3*g*. In this figure it is indicated by broken lines how the amplitude factor of the partial oscillations varying with time becomes manifest in the resultant output oscillation. The broken lines exhibit an exponentially increasing or decreasing variation from the old value to the new value of the amplitude factor.

The output oscillation of the filter 14 is applied through the 90° phase-shifting network 15 to the limiter 16, which converts the output oscillation into a squarewave clock signal, which is illustrated in FIG. 3*h*. The zero passages of the positive-going flanks of the squarewave clock signal coincide, owing to the 90° phase shift by the phase-shifting network 15, with the centres of the pulses in the demodulated sum signal, which is found inter alia from a comparison between the FIGS. 3*f* and 3*h*. From these zero passages there can therefore be derived directly the sampling instants of the correction device 10. The squarewave clock signal is applied for this purpose through a differentiator 17 and a halfwave rectifier 18 to the correction device 10. Part of the sequence of sampling pulses thus formed is shown in FIG. 3*j*.

Owing to the presence of the synchronising signal in the demodulated sum signal the signal-to-noise ratio decreases. It should be noted that the polarity of the sum signal is always the same as the polarity of the information signal, when the amplitude of the synchronising signal is chosen to be smaller than the amplitude of the information signal. Under these conditions it remains possible to state the presence or the absence of an information pulse in the demodulated sum signal, but the signal-to-noise ratio decreases according as the amplitude ratio approaches the ratio 1:1. The amplitude ratio 1:2 is chosen, since in this case the minimum amplitude of the clock signal derived from the demodulated sum signal at the output of the filter 14 is, in the presence of an information signal, equal to the value attained in the absence of an information signal.

It will now be described how the sum signal shown in FIG. 3*f* is converted into the initial information signal shown in FIG. 3*d*. The squarewave clock signal of the frequency $f_2=1/T$ at the output of the limiter 16 is applied through a phase inverting amplifier 19, a differentiator 20 and a halfwave rectifier 21 to a bistable trigger circuit 22, connected like a divide-by-two circuits. The pulses at the output of the rectifier 21, shown in FIG. 3*k*, correspond to the negative-going flanks of the squarewave clock signal. Each of these pulses changes over the trigger circuit 22 so that at the output there appears a squarewave alternating voltage having the same frequency as the synchronising signal and having a phase shift of 180° relative to the latter. This squarewave alternating voltage, shown in FIG. 3*m*, is then conveyed through a filter 28, tuned to the frequency $f_1=1/(2T)$ or through a low bandpass filter having a limit frequency lying between the frequencies $1/(2T)$ and $3/(2T)$, and applied through a variable attenuator 24 to a second input of the adding circuit 9. The filter 23 filters the fundamental oscillation from the squarewave alternating voltage, said oscillation being illustrated in FIG. 3*n*. This fundamental oscillation has the same waveform as the synchronising signal and is shifted in phase through 180° thereto. Before the correction signal appearing at the output of the filter 23 is applied to the adding circuit 9, the amplitude of the correction signal is rendered equal to the amplitude of the synchronising signal at the adding circuit 9 by means of the variable attenuator 24. In the adding device 9 the correction signal is added to the sum signal so that at the output of the adding device 9 only the information signal is left. This information signal is then corrected in the manner described above by the correction device 10, at the output of which there appear the information pulses shown in FIG. 3*p*. The level variations occurring in the transmission system are eliminated by means of automatic gain control so that the level of the synchronising signal at the receiver end is approximately constant. Under these conditions it is sufficient to adjust the attenuator 24 once.

Figure 4:
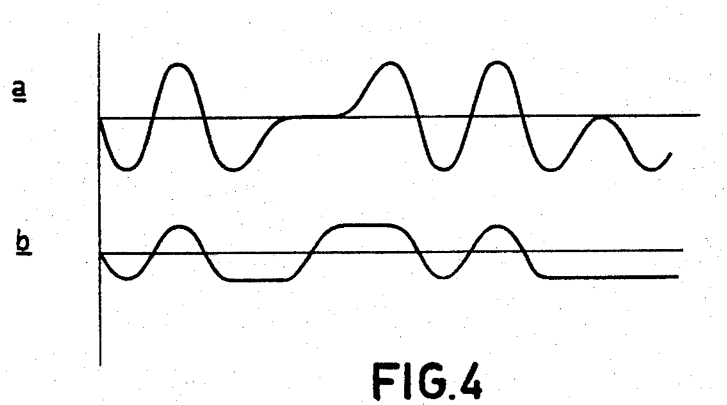

In the receiving device described with reference to FIG. 2 there is the problem that the alternating output voltage of the bistable trigger circuit 22, connected as a divide-by-two circuit has two potential phase positions with a difference of 180°. One of these phase positions is the correct one. In the foregoing it is assumed that the correction signal at the output of filter 23 has the correct phase position, in which it is shifted through 180° relatively to the synchronising signal in the demodulated sum signal. The correction signal may, however, be in the wrong phase position and it then has the same phase as the synchronising signal. In this case the correction signal is added to the sum signal in the same phase as the synchronising signal. At the output of the adding device 9 there then appears a signal of the waveform shown in FIG. 4*a*. FIG. 4*b* shows by way of comparison the separate information signal, as it had to appear at the output of the adding device 9.

With reference to a preferred embodiment of the receiving device, shown in FIG. 5, it will now be described how a correction of the sum signal can be carried out. The correction signal at the output of the variable attenuator 24 is applied to the adding device 9 and through a phase inverting amplifier 25 to a second adding device 26. The demodulated signal is applied directly to the two adding devices. In one of the adding devices the correction signal is added to the sum signal with opposite polarity and in the other adding device with the same polarity as the synchronising signal. At the output of one adding device there results the information signal shown in FIG. 4*b* and at the output of the other adding device the signal shown in FIG. 4*a* is produced. Each of the outputs of the adding devices 9 and 26 have connected to them a resonant circuit 27 and 28 respectively, which are each tuned to the frequency $f_1=1/(2T)$. The non-grounded side of each circuit is connected through a diode 29 and 30 respectively to a trigger input of a bistable trigger circuit 31. The output circuit of the trigger circuit 31 includes a winding of a polar relay R32, which is energized in one direction or in the other in accordance with the position of the trigger circuit 31. The relay contact *r*32 connects the input of the correction device 10 to the output of the adding device 9 or 26 in accordance with the direction of energization of the relay.

The diodes 29 and 30 are biassed in the blocking direction through the resistors 33 and 34 by a positive bias voltage source 35. The resonant circuits 27, 28 allow only part of the frequency spectrum of the signal fed to the circuits to pass so that transient interference signals do not affect the output oscillation. The amplitude of the output oscillation of the resonant circuit 27 or 28, to which only an information signal is fed, is at a maximum when the information signal has the maximum pulse alternating frequency. The maximum value of the oscillation produced across the other resonant circuit is twice as high. This ratio of 1:2 also applies approximately to the relation between the nominal values of the amplitudes. The bias voltage is adjusted to a value which is approximately 50% higher than the nominal value of the amplitude of the output oscillation of the resonant circuit, to which the information signal is fed. The maximum value of the output oscillation of said resonant circuit is at any rate smaller than the bias voltage, and the output oscillation of the other resonant circuit exceeds the bias voltage at irregularly divided instants. At such an instant a pulse is fed through the diode connected to said resonant circuit (29 or 30) to a trigger input of the trigger circuit 31, so that the trigger circuit changes over to the position corresponding to said input or remains in said position. In this position of the trigger circuit 31 the relay R32 is energized so that the relay contact *r*32 connects the input of the correction device 10 to the output of the adding device, at the output of which there appears the information signal. If, for example, the amplitude of the output oscillation of the resonant circuit 27 exceeds the bias voltage, the trigger circuit 31 changes over and relay R32 changes over the relay contact *r*32 from the position shown to the other position and the relay contact connects the output of the adding device 26 to the input of the correction device 10. Thus, independently of the phase position of the correction signal it is ensured that the correctly corrected sum signal is applied to the correction device 10. The adjustment of the relay contact *r*32 will normally take place only when the transmitting and receiving apparatus are switched on so that for the whole transmitting period it is ensured that the correct signal is applied to the correction device.

With reference to FIG. 6 a variation of the preferred embodiment of FIG. 5 of the receiving device will now be described. Whereas the correction device of FIG. 5 may be considered to form a forward control, the correction device shown in FIG. 6 may be considered to be a backward control. In accordance with the phase position of the correction signal at the output of the attenuator 24, the output signal of the adding device 9 has the waveforms shown in FIG. 4*a* or in FIG. 4*b*. The output signal of the adding device 9 is applied through a filter 36, tuned to the frequency $f_1=1/(2T)$ to a threshold device 37. This threshold device comprises for example a diode which is biased in the blocking direction like the diodes 29 and 30 of FIG. 5 by means of a bias voltage source, the voltage value of which is adjusted to the same value. If the correction signal has the wrong phase position, the output signal of the adding device 9 has the waveform shown in FIG. 4*a*, and the output voltage of filter 36 exceeds the bias voltage at irregularly distributed instants. At such an instant the threshold device 37 supplies a pulse to a pulse generator 38, for example a monostable trigger circuit. This pulse changes over the trigger circuit to the astable state, after which the trigger circuit returns automatically into the stable state. In the astable state the trigger circuit is insensitive to further trigger pulses so that, when a plurality of trigger pulses are applied to the trigger circuit within the time of the astable state, said circuit supplies only one pulse at its output. The output pulse of the pulse generator 38 is applied through the differentiator 39 and the halfwave rectifier 40 to a trigger input of a bistable trigger circuit 41, which is changed over during the leading edge of the pulse to the position corresponding to said trigger input. In this position the trigger circuit 41 opens a gate circuit 42, connected to the output. The output pulses of the rectifier 18, which are located each between two successive output pulses of the rectifier 21, are applied to the gate 42, which passes, in its open state, a pulse to the bistable trigger circuit 22, connected as a divide-by-two circuit, so that the trigger circuit changes its position between two successive pulses of the rectifier 21. The alternating output voltage of trigger circuit 22 is thus changed over from the wrong phase position of said instant to the other or correct phase position. The output pulses of the rectifier 18 are, moreover, applied to a second input of the trigger circuit 41, so that the trigger circuit is changed back to the initial position and the gate 42 is closed after it has passed one pulse. The correction signal at the output of filter 23 requires some time for changing over from the wrong phase position to the correct phase position. The duration of the astable state of the pulse generator 38 is chosen so that within the time required for changing over the phase position of the correction signal it supplies only one pulse.

The filter 36 passes only part of the frequency spectrum of the incoming signal and prevents that transient interference signals might lead to performing unwanted correction measures.

What is claimed is:

1. A pulse transmission system comprising a transmitter and a receiver, said transmitter comprising
- a source of equidistant clock pulses,
- a source of information pulses occurring at the instants of said clock pulses,
- means providing synchronization pulses at the instants of said clock pulses, said synchronization pulses having an amplitude smaller than said information pulses, and having successive zero passages which coincide with successive zero passage of the fundamental frequency of said information pulses, and having a repetition frequency half the pulse repetition frequency of said clock pulses.
- means adding said information pulses and synchronization pulses,
- and means for transmitting said added pulses,
- said receiver comprising means for receiving said transmitted pulses,
- network means having a quadratic transmission characteristic curve,
- means applying said received pulses to said network,
- and means for deriving a clock signal synchronized with said clock pulses from said network means.

2. A pulse transmission system comprising a transmitter and a receiver, said transmitter comprising
- a source of equidistant clock pulses,
- a source of information pulses occurring at the instants of said clock pulses,
- means providing synchronization pulses at the instants of said clock pulses, said synchronization pulses having an amplitude smaller than said information pulses, and having successive zero passages which coincide with successive zero passage of the fundamental frequency of said information pulses, and having a repetition frequency half the pulse repetition frequency of said clock pulses,
- means adding said information pulses and synchronization pulses,
- and means for transmitting said added pulses,
- said receiver comprising means for receiving said transmitted pulses,
- network means having a quadratic transmission characteristic curve,
- means applying said received pulses to said network,
- means applying the output of said network means to filter means tuned to the pulse repetition frequency of said clock pulses,
- means for deriving a clock signal synchronized with said clock pulses from said filter means,
- and means for correcting said received signal with said clock signal to provide an output signal.

3. The system of claim 2, in which said means for deriving said clock signal comprises limiting means, means connecting said limiting means to the output of said filter means to produce a square wave signal, and means for differentiating said square wave signal, said means for correcting said received signal comprising means for sampling said received signal with said clock signal.

4. The system of claim 3, comprising means for shifting the phase of said square wave signal by 90 degrees.

5. The system of claim 3, comprising rectifier means for connecting the output of said differentiating means to said correcting means.

6. A pulse transmission system comprising a transmitter and a receiver, said transmitter comprising a source of equidistant clock pulses, a source of information pulses occurring at the instants of said clock pulses, means providing synchronization pulses at the instants of said clock pulses, said synchronization pulses having an amplitude smaller than said information pulses, and having successive zero passages which coincide with successive zero passage of the fundamental frequency of said information pulses, and having a repetition frequency half the pulse repetition frequency of said clock pulses, means adding said information pulses and synchronization pulses, and means for transmitting said added pulses, said receiver comprising means for receiving said transmitted pulses, network means having a quadratic transmission characteristic curve, means applying said received pulses to said network, means applying the output of said network means to filter means tuned to the pulse repetition frequency of said clock pulses, limiting means, means connecting said limiting means to said filter means to provide a square wave signal synchronized with said clock pulses, means connected to said limiting means for producing an alternating signal 180 degrees out-of-phase with said synchronizing signal, means for subtracting said alternating signal from said received signal to remove said synchronizing signal from said received signal, means connected to said limiting means for producing a clock signal synchronized with said clock pulses, and means for correcting the output of said subtracting means with said clock signal.

7. The system of claim 6, in which said means for producing said alternating signal comprises differentiating means connected to said limiting means, rectifier means connected to said differentiating means, bistable circuit means connected to said rectifier means, and means for filtering and alternating the output of said bistable circuit means.

8. The system of claim 7, comprising means responsive to the output of said subtracting means and said clock signal for changing the state of said bistable circuit means to maintain said alternating signal 180 degrees out-of-phase with said synchronizing signal.

9. The system of claim 6, in which said means for producing said alternating signal 180 degrees out-of-phase with said synchronizing signal comprises means for producing first and second alternating signals synchronized with said synchronized signal and having a relative phase difference of 180 degrees, said subtracting means comprising first and second subtracting means, means applying said first and second alternating signals to said first and second subtracting means, respectively, and means responsive to the amplitude of the outputs of said first and second subtracting means for selectively connecting one of said first and second subtracting means to said correcting means.

10. A pulse transmission system comprising a transmitter and a receiver, said transmitter comprising a source of equidistant clock pulses, a source of information pulses occurring at the instants of said clock pulses, means providing synchronization pulses at the instants of said clock pulses, said synchronization pulses having an amplitude smaller than said information pulses, and having successive zero passages which coincide with successive zero passage of the fundamental frequency of said information pulses, and having a repetition frequency half the pulse repetition frequency of said clock pulses, means adding said information pulses and synchronization pulses, low-pass filter means connected to the output of said adding means having a cut-off frequency of approximately ½T wherein T is the pulse duration of said information pulses, and means for transmitting the output of said filter means, said receiver comprising means for receiving said transmitted pulses, network means having a quadratic transmission characteristic curve, means applying said received pulses to said network, means applying the output of said network means to filter means tuned to the pulse repetition frequency of said clock pulses, means for deriving a clock signal synchronized with said clock pulses from said filter means, sampling means, means applying said received pulses and clock signal to said sampling means to sample said received pulses, and output means connected to said sampling means.

References Cited

UNITED STATES PATENTS 3,248,664 4/1966 Krasnick et al. ------ 178—69.5

ROBERT L. GRIFFIN, *Primary Examiner.*

JOHN W. CALDWELL, *Examiner.*

R. L. RICHARDSON, *Assistant Examiner.*